June 19, 1962 G. E. VONVILLE 3,039,542
CULTIVATOR IMPLEMENT
Filed Feb. 15, 1960 2 Sheets-Sheet 1

INVENTOR.
GEORGE E. VONVILLE
BY M. A. Hobbs
ATTORNEY

June 19, 1962  G. E. VONVILLE  3,039,542
CULTIVATOR IMPLEMENT

Filed Feb. 15, 1960  2 Sheets-Sheet 2

INVENTOR.
GEORGE E. VONVILLE
BY M. A. Hobbs
ATTORNEY

United States Patent Office 3,039,542
Patented June 19, 1962

3,039,542
CULTIVATOR IMPLEMENT
George E. Vonville, Culver Mobile Home 5,
515-5 W. Jefferson St., Culver, Ind.
Filed Feb. 15, 1960, Ser. No. 8,804
6 Claims. (Cl. 172—682)

The present invention relates to a cultivating implement, and more particularly to an adjustable cultivator shovel or share.

One of the principal objects of the present invention is to provide a cultivator shovel which prevents tailing, i.e. which will not throw earth onto the plants being cultivated, and which is formed so that the cultivator may be easily directed so as not to cut or shift the plants.

Another primary object of the invention is to provide a cultivator shovel which, while acting as a standard cultivator to weed and loosen the soil, also breaks up large clumps of soil more thoroughly than present cultivators and allows the fine soil to remain near the crop plants while moving coarse soil and trash to the space between rows.

A further object of the invention is to provide an improved cultivator shovel which will break the crust of the soil near the plants without shifting or otherwise endangering the plants.

Still another object of the invention is to provide a cultivator shovel of the above type which eliminates the time-consuming clogging of present cultivators with plant guards.

Another object of the present invention is to provide a non-clogging cultivator which gives the farmer a clear view of the plants, allowing him to cultivate at a higher rate of speed and resulting in a greater area being cultivated in a given period of time with less or equal fuel consumption than at present.

Another object of the invention is to provide a shovel which may be adjusted for different types of soil and which can be mounted on supports conventionally provided on cultivators for removable shovels without modification of the support.

A further object is to provide an adjustable cultivator shovel or share which is composed of several simple, easily manufactured parts, which can be simply mounted on conventional cultivators, and which contains a reduced amount of steel from that usually used in cultivator shares.

Additional objects and advantages will become apparent from the following description and accompanying drawings, wherein.

Figure 1:
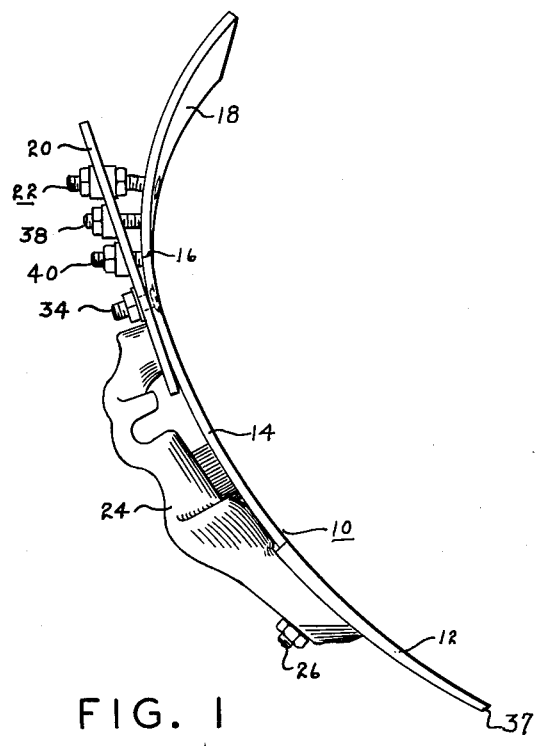
FIGURE 1 is a side elevational view of my shovel shown mounted on a conventional support.

Referring more specifically to the drawings, numeral 10 designates generally my shovel, having a spear 12, a bottom section 14 with an upper beveled edge 16, a top section 18, a back section 20, and an adjusting means 22 connecting the top and back sections. These are mounted on the conventional mounting bracket or support 24, the spear being held by bolt 26, and the bottom section by bolts 28 and 30. The bottom section has a degree of curvature at numeral 32 which is higher than that of conventional shovels at the corresponding point, and is slightly tilted in order to produce the initial lateral throw of the soil. Although the bolt 30, when seated firmly on bottom section 14, is tilted slightly with respect to the conventional support 24, the nut for this bolt is firmly seated on support 24.

Figure 2:
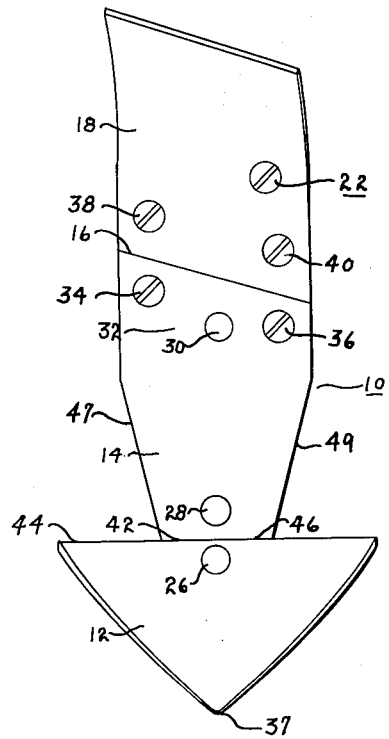
FIGURE 2 is a front elevational view of the shovel.

The back section 20 is mounted on bottom section 14 by bolts 34 and 36 as shown in FIGURES 1 and 2, and extends therefrom in a plane tangential to the bottom portion 14 to provide a firm support for top section 18. The top section 18 is held by bolts 38 and 40 to the back section 20 at the bottom of the top section, and the top section 20 at the bottom of the top section, and the top section is held in spaced relation to the back by adjustable means 22. The high degree of curvature of the bottom 14 is maintained by top section 18 to bring the soil upward and over, thus burying the weeds, breaking large clumps in the fall from the top, and preventing soil from falling behind the shovel and clogging the cultivator. Further, to prevent soil from being thrown onto the plants and to keep it from piling up in front of the shovel, a longitudinal twist is introduced in the upper part of the top portion which throws the soil off to one side or the other. Although the share shown will throw the soil to the right of the farmer, the share can be formed with a twist to throw it to the left, and usually these shares are used in pairs with opposite twists, throwing soil away from the crop plants between them.

The spear is triangular in shape with one point 37 at the bottom and the flat upper side butted against the bottom section 14 at 42. This construction prevents the spear from rotating and allows it to be secured solidly by the single bolt 26. As will be seen in FIGURE 2, the upper edge 44 of the spear is much longer than the corresponding edge 46 of the bottom section, the bottom section being reduced in width by bevels 47 and 49. This construction allows the fine soil, the particles of which are very small, to sift over the top of the spear and remain near the plants being cultivated. On the other hand, coarse soil, stones, chunks of soil, and other trash, on account of their greater bulk, cannot pass over the top of the spear and are forced onto the bottom portion 14 and thence up along top section 18 and over to the ground.

Figure 3:
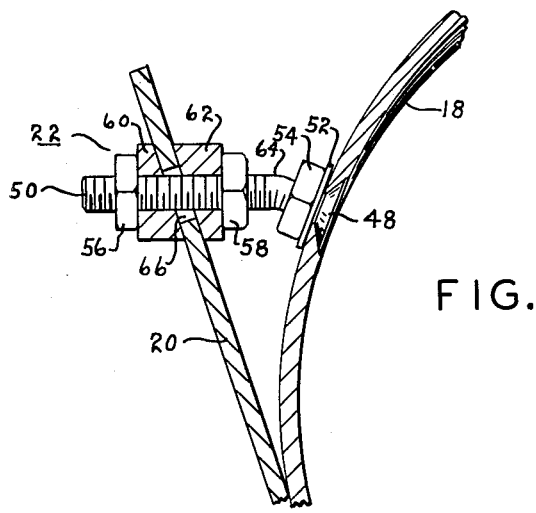
FIGURE 3 is an enlarged fragmentary cross sectional side view of the upper portion of the shovel, showing the adjustment means.

At times adjustment of the angle between sections 14 and 18 is required because of varying soil and crop conditions requiring the soil to be thrown greater or lesser distances forward and to the side of the share. For the purpose of adjustment, means 22 is provided. This means, as shown in FIGURE 3, consists of a head 48, shank 50, washer 52 and nut 54 for holding top section 18, and nuts 56 and 58 and beveled washers 60 and 62 for holding the back section 20. These parts hold the back and top sections at the proper angle by means of a bend 64 in the shank 50. The angle that the top section makes with bottom section 14 can be changed by loosening the two bolts 38 and 40 and then loosening either of the nuts 56 or 58 and tightening the other, the one loosened being determined by the change of angle desired. To allow for the required change in position of means 22 on the back 20, a slot 66 is provided in which the bolt can slide upwardly or downwardly. The bevel 16 acts as a pivot during this change of angle so that the top will tend to throw material farther to the side as well as farther forward when it is adjusted to make a greater angle with bottom section 14. After adjustment is completed, the bolts 38 and 40 are again tightened, thus rendering the assembly effectively one solid unit.

Figure 4:
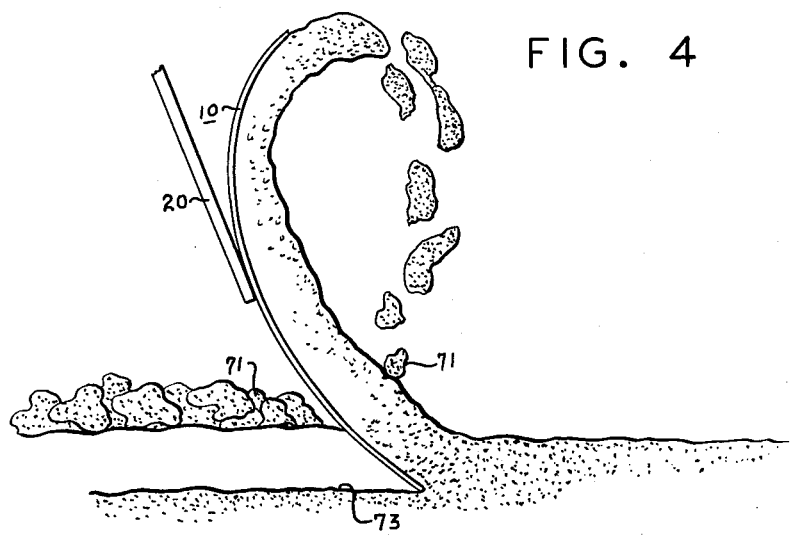
FIGURE 4 is a diagrammatical side view of the shovel in operation showing it as it turns the soil over, at the same time breaking up large clumps and throwing the soil to the side.
Figure 5:
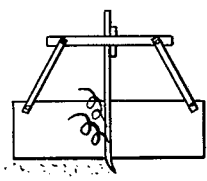
FIGURE 5 is a diagrammatical side view of a conventional shovel with a plant guard.
Figure 6:
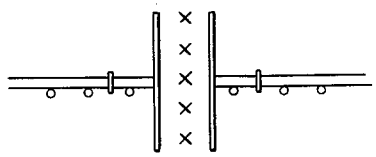
FIGURE 6 is a diagrammatical top view of several conventional shovels in use with a pair of plant guards guarding a plant row.

One of these shares is mounted on each of the supports conventionally supplied on the cultivator, and the farmer operates the cultivator in the usual manner. At the shovels 10, the spear 12 cuts into the ground and the soil flows on the sections 14 and 18 in the manner previously described and falls onto the ground beside the share, as shown at 71 in FIGURE 4. However, because the earth brought up along sections 14 and 18 is thrown to the side, the spear has a fairly uniform pressure upon it, and therefore operates at a more uniform depth, as shown at 73 in FIGURE 4, than many present shares. Thus the whole field is properly cultivated with this share, with no sections only lightly worked or cultivated too deeply. Since the bottom and top sections 14 and 18 are of much smaller width than the top of the spear, the farmer's view of the plants is not obstructed by these parts, as it is by present day wide shares or plant guards. As a result, the shares may be mounted much closer to the plants than they are at present, thus producing better cultivation, as the contrast between FIGURES 7 and 8 indicates. Furthermore, the farmer may cultivate very rapidly, and thus cover a much larger area than at present with the same consumption of fuel and in the same amount of time.

This new share has a number of advantages. For example, since no plant guard is needed, either separate or built-in, less steel is used in manufacturing this unit than with most conventional shares designed to protect plants from tailing. Furthermore, because of the smaller size and lack of a plant guard, the power required to operate the cultivator is less than with conventional cultivators. There is also less wear on this share, and hence lower maintenance cost, and since my share is composed of several parts, when a part breaks, replacement is simple and inexpensive.

Figure 7:
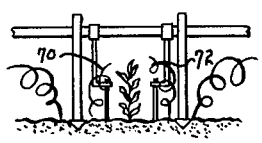
FIGURE 7 is a diagrammatical end view of part of a conventional cultivator provided with plant guards showing how soil can be pushed over the guard onto the plant.
Figure 8:
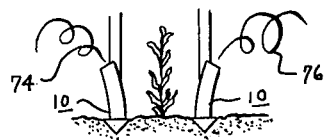
FIGURE 8 is a diagrammatical end view of my shovel showing the soil being thrown away from the plants.

As illustrated in FIGURE 8 at 74 and 76, the earth and trash are thrown away from the plants, thus avoiding the crippling, retarded growth, and death of the plants that sometimes occur, in the manner shown in FIGURE 7 at points 70 and 72, from shovels with plant guards. Thus, the improved cultivator shovel evenly cultivates a large field quickly without endangering the plants, while cultivating closer to the plants than present cultivator shovels, sifting the fine soil from the trash, and breaking crusted and clumped soil.

While only one embodiment of the present invention has been described in detail herein, various changes and modifications can be made in my cultivator shovel structure without departing from the scope of the invention. For example, the back section can be made integral with section 14, thus simplifying the mounting and replacing of parts.

I claim:

1. A shovel for a soil cultivator implement having a mounting bracket, comprising a triangular shaped forwardly facing spear with a substantially horizontal upper edge, bolt means for securing said spear to said bracket, a forwardly facing adjustably curved member for throwing soil forwardly over said spear, said member including a plate-like bottom section having a slightly upward and forward curvature, the curvature being slightly more on one side than the other, bolt means for securing said bottom section to said bracket in abutting relation with the upper edge of said spear, a back plate extending upwardly in a plane tangential to the bottom section, means securing said back plate to the upper portion and rear of said bottom section, an upwardly and forwardly extending arcuate upper section seated against the upper edge of said bottom section, the upper edge of said upper section being substantially directly above the upper edge of said spear, said upper section having the side edge normally adjacent the nearest row under cultivation extending slightly forward of the opposite side edge and being shorter than said opposite side, both of said side edges extending slightly to the side opposite said most forwardly extending edge, and bolt means connected to said upper section and back plate for selectively pivoting said upper section forwardly and rearwardly at the junction between said bottom and upper sections.

2. A shovel for a soil cultivator implement, comprising a forwardly facing spear with a substantially horizontal upper edge, a forwardly facing adjustably curved member for throwing soil forwardly over said spear, said member including a plate-like bottom section having an upward and forward curvature in abutting relation with the upper edge of said spear, a back plate extending upwardly in a plane tangential to the bottom section, means securing said back plate to the upper portion and rear of said bottom section, an upwardly and forwardly extending arcuate upper section seated against the upper edge of said lower section, the upper edge of said upper section being in the proximity of a vertical line extending upwardly from the upper edge of said spear, said upper section having the side edge normally adjacent the nearest row under cultivation extending slightly forward of the opposite side edge and being shorter than said opposite side, both of said side edges extending to the side opposite said most forwardly extending edge, and bolt means connected to said upper section and back plate for selectively pivoting said upper section forwardly and rearwardly at the junction between said lower and upper sections.

3. A shovel for a soil cultivator implement, comprising a forwardly facing spear, a forwardly facing adjustably curved member for throwing soil forwardly over said spear, said member including a plate-like bottom section having upward and forward curvature, a back plate secured to the upper and rear portion of said bottom section and extending upwardly and rearwardly, an upwardly and forwardly extending arcuate upper section seated against the upper edge of said lower section, the upper edge of said upper section being in the proximity of a vertical line extending upwardly from the upper edge of said spear, said upper section having the side edge normally adjacent the nearest row under cultivation extending slightly forward of the opposite side edge and being shorter than said opposite side, both of said side edges extending to the side opposite said most forwardly extending edge, and means connected to said upper section and back plate for selectively pivoting said upper section forwardly and rearwardly at the junction between said lower and upper sections.

4. A shovel for a soil cultivator implement, comprising a forwardly facing spear, a forwardly facing adjustably curved member for throwing soil forwardly over said spear, said member including a plate-like bottom section, a back plate secured to the upper and rear portion of said bottom section and extending upwardly and rearwardly, an upwardly and forwardly extending arcuate upper section, the upper edge of said upper section being in the proximity of a vertical line extending upwardly from the upper edge of said spear, said upper section having the side edge normally adjacent the nearest row under cultivation extending slightly forward of the opposite side edge, both of said side edges extending to the side opposite said most forwardly extending edge, and means connected to said upper section and back plate for selectively pivoting said upper section forwardly and rearwardly at the junction between said lower and upper sections.

5. A shovel for a soil cultivator implement, comprising a forwardly facing spear, a forwardly facing adjustably curved member for throwing soil forwardly over said spear, said member including a plate-like bottom section, an upwardly and forwardly extending arcuate upper section, the upper edge of said upper section being in the proximity of a vertical line extending upwardly from the upper edge of said spear, said upper section having the side edge normally adjacent the nearest row under cultivation extending slightly forward of the opposite side edge, both of said side edges extending to the side opposite said most forwardly extending edge, and means for adjusting the upper end of said upper section forwardly and rearwardly.

6. A shovel for a soil cultivator implement, comprising a forwardly facing spear, a forwardly facing adjustably curved member for throwing soil forwardly over said spear, said member including a plate-like bottom section, and an upwardly and forwardly extending arcuate upper section, the upper edge of said upper section being in the proximity of a vertical line extending upwardly from the upper edge of said spear, said upper section having the side edge normally adjacent the nearest row under cultivation extending slightly forward of the opposite side edge, and both of said side edges extending to the side opposite said most forwardly extending edge.

References Cited in the file of this patent

UNITED STATES PATENTS

| | | |
|---|---|---|
| 133,187 | Baughn | Nov. 19, 1872 |
| 146,524 | Gaines | Jan. 20, 1874 |
| 649,808 | Bystrom | May 15, 1900 |
| 1,303,961 | Raun | May 20, 1919 |
| 1,740,739 | Kipp | Dec. 24, 1929 |
| 2,907,397 | Murer | Oct. 6, 1959 |

FOREIGN PATENTS

| | | |
|---|---|---|
| 954,559 | Germany | Dec. 20, 1956 |